(12) United States Patent
Bacon

(10) Patent No.: X9613
(45) Date of Patent: Apr. 28, 1836

(54) WINDOW BLINDS, FASTENER

(76) Inventor: Jonathan Bacon

Jonathan Bacon
Letters Patent

The Schedule referred to in these Letters Patent and making part of the same containing a description in the words of the said Jonathan Bacon himself of his improvement in fasting Window Blinds Specification of the foregoing Improvement.
A Blind fast with double vibrating spring which diminishes friction without increase by exposure to the weather — consists of a metalic spring about six inches long and 7/8 in. wide with a piece of composition about three inches long and a catch at each end riveted fast at one end of the spring transversely. A lever about the same length and breadth of the spring, bent near the centre about ten degrees, with a notch in one end. A pin of composition 1 1/2 in. long with a head. A hook to drive into the wall of the House and a staple to drive into the window stool.
Application of the fast to the blind. The spring is made fast at the [illegible] from the catch, to the bottom of the lower rail of the Blind, with two screws. The pin passes through a perforation in the spring near the catch and driven within half an inch of the head for the spring to vibrate on. The lever is made fast to the said Rail at the bend, and one end passes under the catch to the pin. When the Blind is open press the lever to the bottom of the Blind, and it unloosens from the wall. when shut bear the thumb upon the catch, it will unloose from the stool. the catch striking the hook, and staple at an angle with the spring when ply'd produces the double vibration of the spring which diminishes friction &c.

Witnesses
Clark Bacon
Frederick Bacon

Jonathan Bacon Esq.
[illegible]

302 [illegible] (Rec'd & Recorded anew July 9. 1838)